United States Patent [19]

Lloyd

[11] E Re. 29,591

[45] Reissued Mar. 28, 1978

[54] COLUMN STABILIZED STINGER TRANSITION SEGMENT AND PIPELINE SUPPORTING APPARATUS

[75] Inventor: Samuel H. Lloyd, Houston, Tex.

[73] Assignee: Santa Fe International Corporation, Orange, Calif.

[21] Appl. No.: 687,172

[22] Filed: May 17, 1976

Related U.S. Patent Documents

Reissue of:

[64] Patent No.: 3,704,596
Issued: Dec. 5, 1972
Appl. No.: 22,634
Filed: Mar. 25, 1970

U.S. Applications:

[63] Continuation of Ser. No. 529,558, Dec. 4, 1974, abandoned.

[51] Int. Cl.[2] ..... B63B 35/04; F16L 1/00

[52] U.S. Cl. ..... 61/108; 114/270; 114/61

[58] Field of Search ..... 61/108, 109, 105; 114/61

[56] References Cited

U.S. PATENT DOCUMENTS

| | | | |
|---|---|---|---|
| Re. 28,922 | 8/1976 | Lloyd | 61/108 |
| 1,753,399 | 4/1930 | Blair | 114/61 |
| 3,321,925 | 5/1967 | Shaw | 61/108 |
| 3,407,610 | 10/1968 | Wolff | 61/88 |
| 3,411,306 | 11/1968 | Mosby | 61/108 |
| 3,440,826 | 4/1969 | Kline | 61/108 |
| 3,462,963 | 8/1969 | Moore | 61/72.4 |
| 3,507,126 | 4/1970 | Rochelle | 61/108 |
| 3,589,136 | 6/1971 | Sorenson | 61/108 |

*Primary Examiner*—Jacob Shapiro
*Attorney, Agent, or Firm*—LeBlanc & Shur

[57] ABSTRACT

The stinger segment includes a base structure having a plurality of upstanding stabilizing columns on opposite sides of its pitch and roll axes and carrying pipeline supports which permit translational movement of the pipeline relative to the stinger segment. The stinger segment is pivotably secured behind the pipelaying barge and is ballasted from a low draft condition with the base structure having freeboard to a high draft condition with the mean waterline located at about one half the effective height of the stabilizing columns when in the pipeline supporting position. The pipeline supports progressively decrease in height above the base structure from the end of the segment nearest the barge toward the opposite end such that a line extending along the supports defines a radius of curvature at least equal to and preferably much greater than the minimum allowable radius of curvature for the pipeline. The stinger segment is preferably configured such that the combined natural frequency of the segment, pipeline, and stinger match the natural frequency of the pipelaying barge. A stinger is secured to the aft end of the stinger transition segment to guide and support pipeline aft of the segment and before disposition on the sea floor.

46 Claims, 9 Drawing Figures

INVENTOR
SAMUEL H. LLOYD

BY Le Blanc & Shur

ATTORNEYS

COLUMN STABILIZED STINGER TRANSITION SEGMENT AND PIPELINE SUPPORTING APPARATUS

Matter enclosed in heavy brackets [ ] appears in the original patent but forms no part of this reissue specification; matter printed in italics indicates the additions made by reissue.

*This is a continuation of application Ser. No. 529,558 filed Dec. 4, 1974 now abandoned, which is a Reissue of Pat. No. 3,704,596 issued Dec. 5, 1972.*

The present invention relates to a subaqueous pipe and cable laying apparatus and particularly relates to a column stabilized stinger transition attachment or segment for pipe or cable laying barges having elevated working platforms. The present invention, also, relates to a column stabilized apparatus for supporting pipes and cables over bodies of water and in spaced relation above the mean waterline.

Increased activity in offshore gas and oil exploration and development has created an insistent demand for cables and pipelines connecting the offshore sites with onshore terminals. For example, it is often desirable to directly connect an offshore oil producing well with an onshore terminal by means of a pipeline laid along the sea floor whereby oil issuing from the well may be directly communicated to the onshore terminal. Apparatus for laying pipelines along the sea floor has been provided in the past and oftentimes includes pipelaying barges whereon the pipes are connected one to the other and then payed out from the barge for disposition on the seabottom as the barge advances. Pipelines, of the type commonly employed for this purpose, are capable of resisting bending stresses within predetermined limits. Such stresses would not normally be exceeded in shallow water pipelaying operations. However, as the water depth increases, the length and hence weight of pipe which must be supported from the pipelaying barge increases with the pipeline obtaining a generally S-shaped configuration between the barge and the seabottom, the radiuses of curvature of the pipe tending to decrease as the distance between the barge and seabottom or water depth increases. Hence, there is a limit to the radius of curvature which a specified pipeline can obtain without incurring bending stresses exceeding the maximum allowable bending stresses for that particular pipeline and which stresses would result in rupture of the pipeline.

Stingers have been employed in the past in efforts to overcome the foregoing and other problems associated with laying subaqueous pipelines, particularly in deep water. Stingers, either fixed or articulated, comprise devices used to support the pipeline after it has been payed out from the barge and prior to its disposition on the seabottom. Conventionally, the stinger connection to the pipelaying apparatus, which is normally a surface floating barge, is located at or near the operating waterline of the lay barge. An inclined ramp is conventionally constructed on the lay barge to assist in obtaining the proper curvature of the pipeline as it enters the stinger, the ramp usually terminating at the operating waterline. The inclined ramp, however, reduces the available work space on the lay barge due to its disposition near the waterline. More importantly, the surface floating pipelaying barge is subject to wind and wave action which causes excessive barge and stinger motion. As is usually the case, pipelaying operations must be terminated in medium to high seas (waves in excess of 4 or 5 feet) due to large heave motions of the stinger and pipelaying vessel and mismatched vertical motion between the pipelaying barge and the stinger due to wave action. When large heave motions are obtained, there is increased likelihood that the pipeline will exceed its allowable bending stress and rupture.

Accordingly, it is desirable to employ a pipelaying vessel which has minimum motion response to wave excitation forces whereby the vessel can be substantially motionless even in high seas. Such a vessel having a minimum motion characteristics is disclosed in U.S. Pat. Application Ser. No. 705,175, filed Feb. 13, 1968 and is characterized by the provision of a plurality of stabilizing columns having a base floatation structure at their lower ends and a work platform adjacent their upper ends. This vessel is supported in a low draft condition by the base flotation structure and in a high draft condition, by preferrably ballasting the base structure, by the residual displacement of the base structure and the submerged portion of the columns. In the high draft condition with the mean waterline located at about one-half the effective height of the columns, the vessel obtains minimum motion response to wave action. As a necessary condition to its effective employment, the work deck of this vessel must be elevated a considerable distance above the mean waterline (even in the high draft condition the work deck is about 15 to 20 feet above the mean waterline). Apart from the foregoing, it has also been found desirable to maintain the work area or platform on which the pipeline sections are connected one to the other and from which the sections are payed out onto the stinger well above the mean waterline such that the work can be efficiently conducted and continued even during heavy seas. Thus, when employing a column stabilized vessel for pipelaying operations on which the work platform is both necessarily and desirably elevated above the mean waterline in the high draft column stabilized condition of the vessel, there is a large length of pipeline which must be supported in the air from the elevated after deck portion of the column stabilized pipelaying barge to the point at which the pipeline enters the water (in addition to the portion of the pipeline extending from the surface of the water to the seabottom). A conventionally constructed stinger cannot be employed by itself for this purpose as it is simply not designed to provide support for and transition of the pipeline from an elevated work deck through the air to its point of entry into the water. The frequency response of the conventional stinger to wave action under these conditions would not normally be the same as or bear any relation to the frequency response of the pipelaying barge to wave action and this would result in mismatched heave motions deleterious to effective pipelaying operations particularly in heavy seas.

Accordingly, it is a primary object of the present invention to provide a stinger transition attachment or segment for subaqueous pipeline laying operations from a lay vessel having an elevated work deck.

It is another object of the present invention to provide a column stabilized stinger transition segment for supporting a pipeline as it is payed out from a pipelaying vessel in a manner to minimize and substantially eliminate heave motions of the pipeline due to excitation forces caused by wave action on the pipelaying barge and associated stinger apparatus.

It is still another object of the present invention to provide a column stabilized stinger transition segment for supporting the air length of a pipeline between the elevated work area of a pipelaying barge and the point of entry of the pipeline transition into the water as the pipeline is payed out in a manner to substantially preclude rupture of the pipeline due to relative motion of the pipelaying barge and the ground supported pipeline.

It is a further object of the present invention to provide a column stabilized stinger transition segment having a natural frequency matched as nearly as possible to the natural frequency of the accompanying pipelaying barge when in a pipeline supporting condition to preclude relative motion between the pipelaying barge and the segment due to wave action on both the barge and stinger segment.

It is a still further object of the present invention to provide a column stabilized pipelaying barge and a column stabilized stinger transition segment configured to minimize barge and stinger segment motion due to excitation forces thereon caused by wave action (hereinafter called "motion minimizing characteristics").

It is a related object of the present invention to provide a column stabilized support for overwater pipelines.

These and further objects and advantages of the present invention will become more apparent upon reference to the following specification, claims and appended drawings, wherein:

Figure 9:
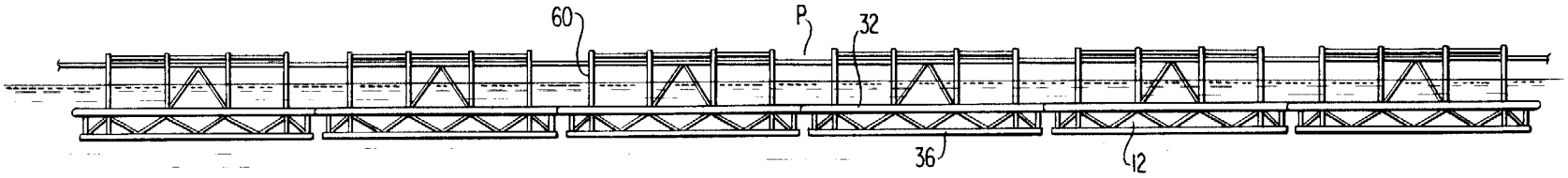
Figure 3:
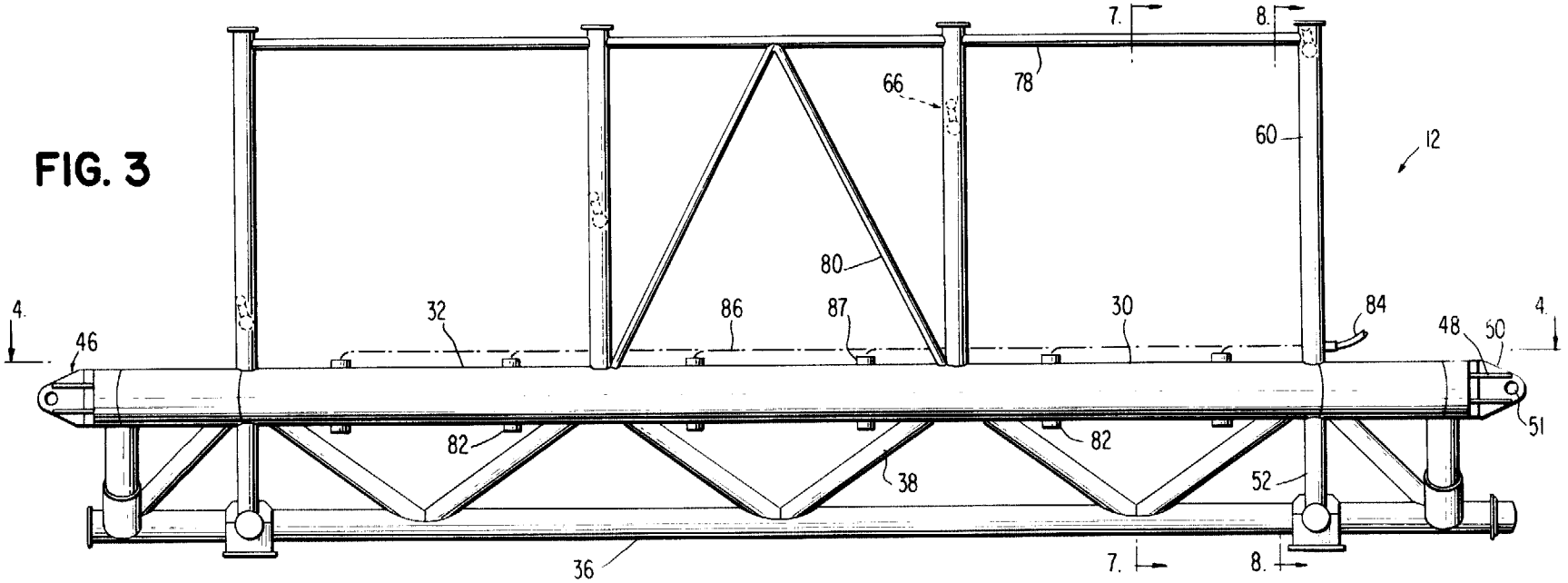
FIG. 3 is a side elevational view of a column stabilized stinger attachment or segment constructed in accordance with the present invention.
Figure 7:
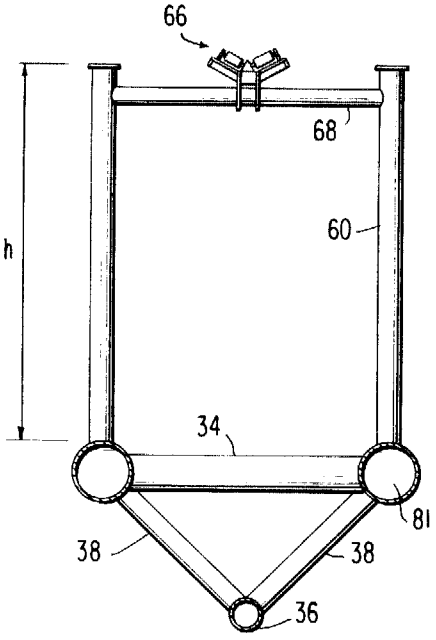
Figure 8:
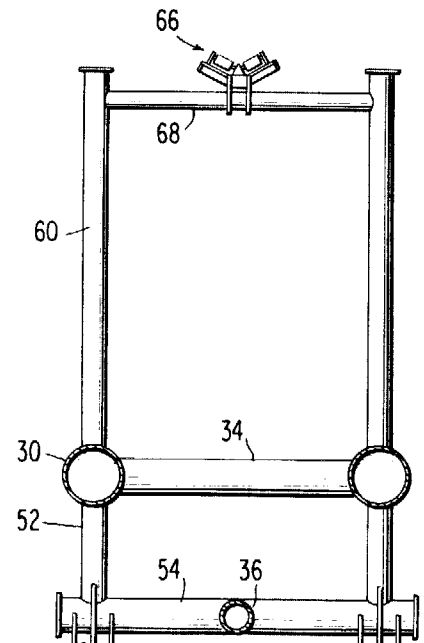

FIGS. 7 and 8 are cross sectional views thereof taken generally about on lines 7—7 and 8—8 respectively in FIG. 3; and FIG. 9 is a fragmentary side elevational view of a series of interconnected column stabilized segments illustrating another form of the present invention.

Figure 1:
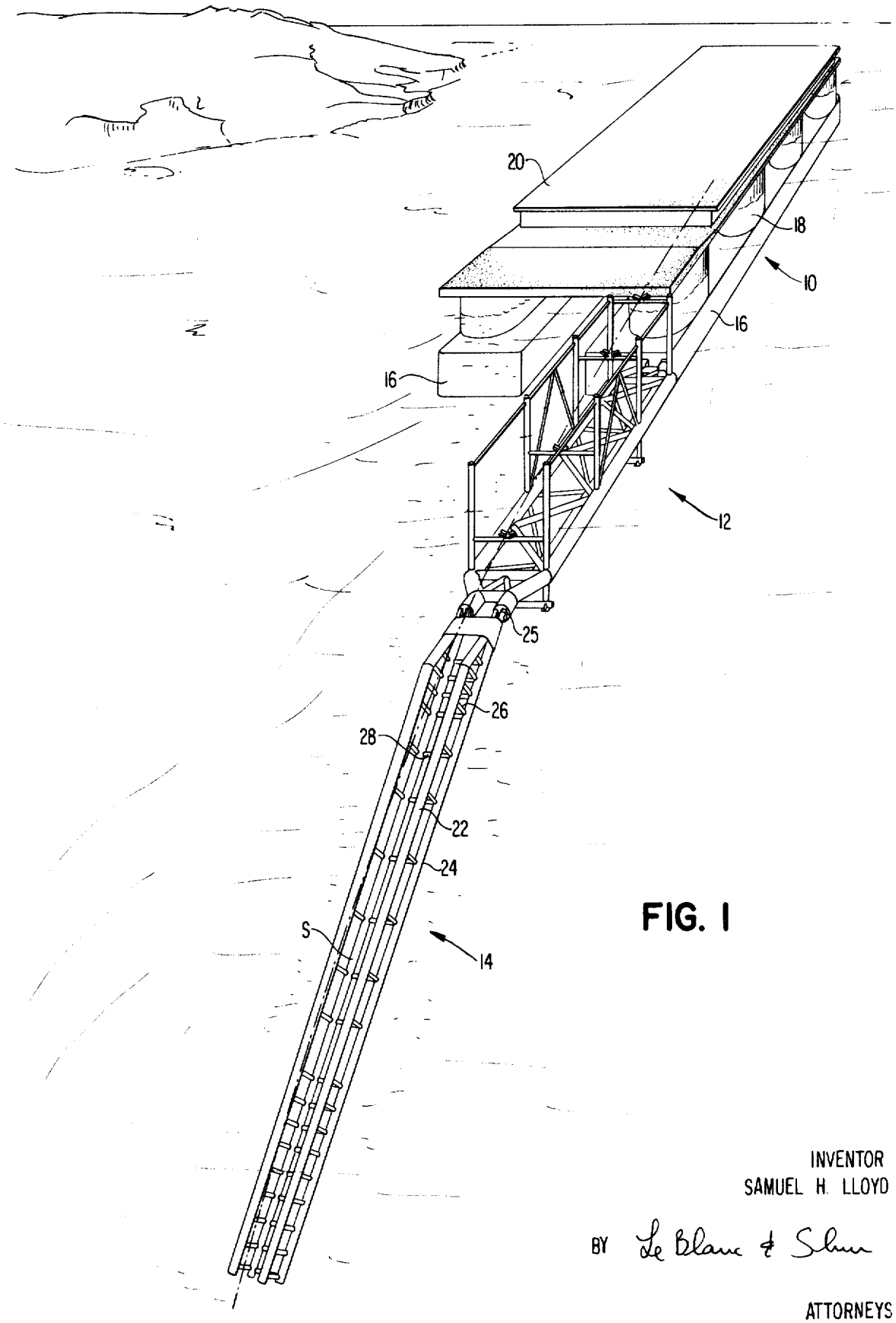
FIG. 1 is a perspective view illustrating a pipelaying apparatus constructed in accordance with the present invention.

Referring now to FIG. 1, there is illustrated a form of the present invention in which a pipelaying barge, generally indicated 10, is illustrated towing a column stabilized stinger segment, generally indicated 12, which, in turn, tows a stinger generally indicated at 14. In the form of the invention illustrated in FIG. 1, the pipelaying barge is, per se, a column stabilized barge and may be of the type disclosed in co-pending application Ser. No. 705,175 filed Feb. 13, 1968 of common assignee herewith, the disclosure of which application is incorporated herein by reference as though herein fully set forth. Briefly, pipelaying barge 10 comprises a pair of transversely spaced, elongated hulls 16 each carrying a plurality of upstanding stabilizing columns 18. Columns 18 support a work platform 20 adjacent their upper ends, platform 20 lying in spaced relation above hulls 16 a predetermined height at least equal to the maximum anticipated wave height. The hulls 16 include ballast compartments, not shown, and barge 10 is configured such that it floats in an unballasted low draft condition with the hulls having freeboard when in transit between work sites, with the mean waterline M.W.L. lying below the top side of the hulls 16. At a work site, for example, astride a track along the seabottom on which pipeline is to be laid, the hull compartments are ballasted to submerge the hulls and portions of columns 18 such that the mean waterline is located at approximately one-half the effective height of columns 18 as illustrated whereby a high draft condition and substantial transparency to wave action is obtained. Furthermore, the cross sectional area and configuration of columns 18, the weight distribution of barge 10 and the geometry of submerged hulls 16 are such as to provide vessel motion minimizing characteristics in roll, pitch and heave in the high draft condition illustrated in FIG. 1. That is to say, barge 10 is configured to provide minimum motion response to wave excitation forces in the high draft condition. Additionally, the vessel is configured to have long natural periods in heave, pitch and roll in the high draft condition and which periods are beyond the range of anticipated wave periods as to avoid motion amplification due to interaction of vessel and wave motion. It will be appreciated that auxiliary equipment, not shown, for storing, manipulating, racking, connecting, etc., the various pipe sections to be laid is carried by pipelaying barge 10 on work platform 20 and that in the ballasted high draft pipelaying condition the work platform 20 remains elevated a substantial distance above the mean waterline, for example, on the order of 15 to 20 feet. Also, it is desirable in pipelaying operations conducted in deep water to apply a predetermined axial tension to the pipeline in order to reduce the curvature of the generally S-shaped pipeline portion which extends between the pipelaying apparatus and the seabottom. To this end, a plurality of rollers, not shown, can be disposed on the work platform 20 of barge 10 in a position engaging about the pipe. The rollers can be controlled by a suitable drive mechanism, not shown, to provide a constant tension on the pipe thereby to increase the radius of curvature of the depending pipeline in comparison with the radius of curvature of an un-tensioned pipeline. As will be appreciated, the pipeline is thus laid in tension with the barge being alternately stopped such that additional pipe sections can be added and secured to the pipeline and advanced such that the additional sections can be payed out from the barge. For purposes of this application, the term pipeline as employed herein is intended also to include one or more cables within its scope.

The stinger 14 may be conventional in construction and includes a pair of sidewall structure each formed of a pair of tubular members 22 and 24 connected one to the other by side struts 26. These sidewall structures are connected one to the other by transversely extending struts 28 connecting between the lower tubular members 24. In this manner, an upwardly opening slot S is formed coextensive in length with stinger 14. The pipeline extends within the slot and is thereby guided and supported in a conventional manner. The forward end of stinger 14 includes a pair of forwardly projecting lugs 25 for hingedly connecting stinger 14 to the aft end of stinger transition segment 12 which will now be described in detail.

Figure 4:
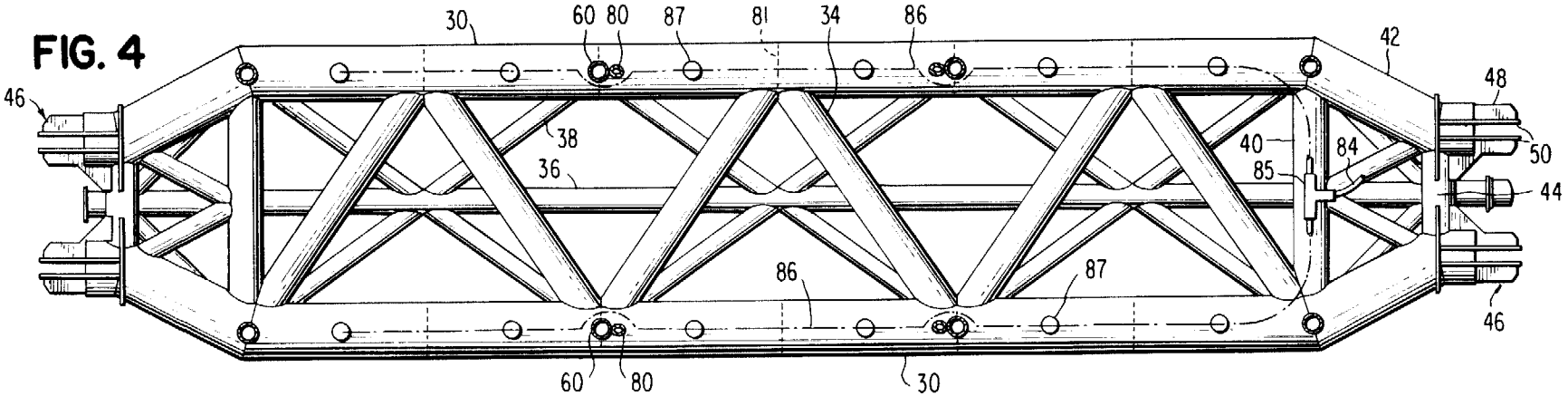
FIG. 4 is a cross sectional view thereof taken generally about on line 4—4 of FIG. 3.
Figure 5:
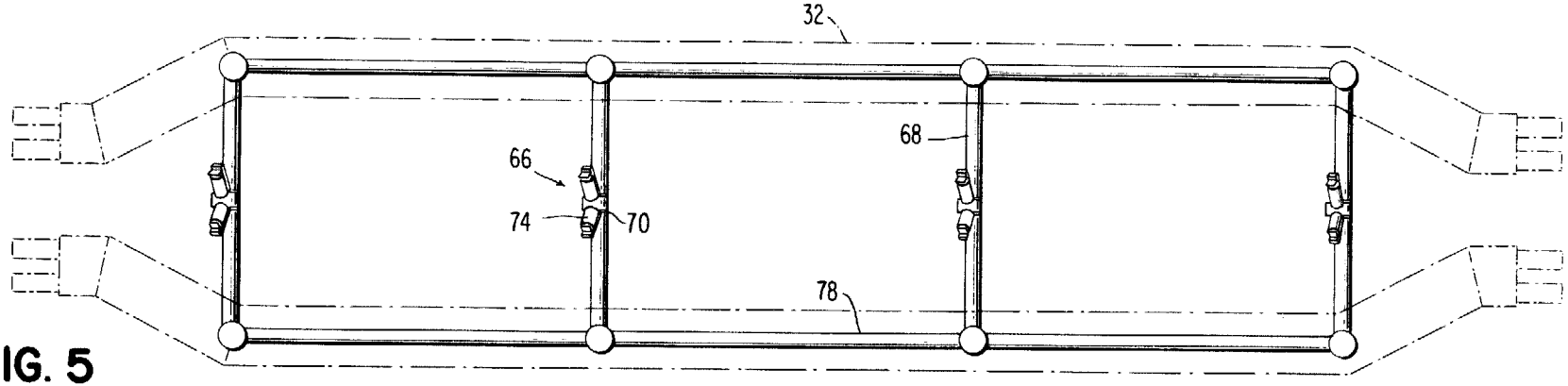
FIG. 5 is a top plan view of the stinger segment hereof.

Referring now to FIGS. 3, 4, and 5, stinger transition segment 12 is preferrably an all steel tubular welded construction including a generally triangularly shaped base or hull structure 30 having a pair of transversely spaced elongated tubular or pontoon-like members 32 connected one to the other by a plurality of diagonally disposed cross tubular members 34. A lower centrally disposed tubular keel 36 depends from tubes 32 by a framework including a plurality of diagonally extending, inwardly inclined, tubular braces 38 connecting between central tube 36 and respective tubular members 32. Like tube ends of tubular members 32 are joined one to the other by transversely extending tubular struts 40. Each end of tubular member 40 includes a short length of tubing 42 which extends inwardly toward the centerline of the stinger segment. The ends of the short tubes 42 are connected one to the other by short transversely extending tubes 44.

The opposite ends of the transition segment are also each provided with a part of laterally spaced hinges 46. Specifically, each hinge includes a pair of horizontally and vertically extending plates 48 and 50 respectively, the plates being interlocked one of the other by welding. Registering openings 51 are provided through the ends of the vertically extending plates between the pair of horizontally extending plates and are adapted to receive hinge pins 53 for connecting the stinger transition segment at opposite ends to pipelaying barge 10 and stinger 14 respectively.

Vertically depending tubular legs 52 are provided at opposite ends of tubular members 32. The lower ends of each pair of legs 52 at opposite ends of stinger segment 12 are connected to opposite ends of lower transversely extending tubular members 54 which, in turn, are connected to tubular keel 36. A base or footing 56 is provided on the underside of each of the opposite ends of transverse tubular members 54 in vertical alignment with legs 52 to provide a four point support for segment 12 when supported on the ground. It will be appreciated that the foregoing described hull or base structure 30 is symmetrical about a longitudinal centerline.

As specifically illustrated in FIGS. 3–8, there is provided a pipeline supporting and stinger transition segment stabilizing structure upstanding from the base or hull structure 30. This upstanding structure includes a plurality of stabilizing columns 60 suitably secured at their lower ends to the tubes or pontoon-like members 32. Columns 60 extend upwardly from the upper surface of base structure 30 an effective height h, (FIG. 7) which may be equal to and is preferrably greater than the maximum anticipated wave height, i.e., the vertical distance between wave crest and trough. In the preferred embodiment, four pairs of columns 60 are equally longitudinally spaced one from the other along base structure 30 with the column arrangement on each tube or pontoon-like member 23 being symmetrical with respect to the column arrangement on the other tubular or pontoon-like member 32. As illustrated, in FIGS. 5 and 7, columns 60 are preferably circular in cross section and constant in cross sectional area throughout their effective height. Columns 60 provide for motion minimizing characteristics when the stinger segment lies in a semisubmerged high draft operating condition as described hereinafter, and have a cross-sectional area as to provide stability to the segment when disconnected.

Figure 6:
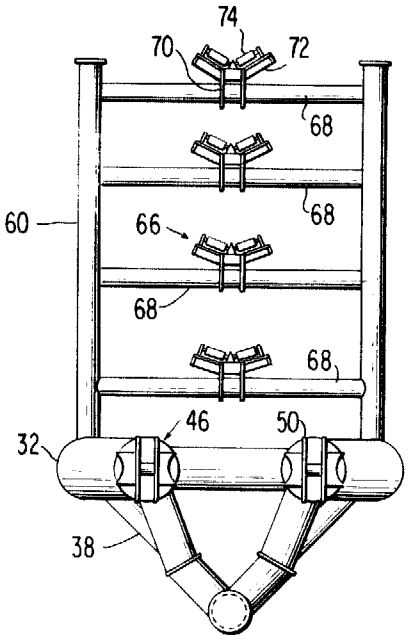
FIG. 6 is an end elevational view of the stinger segment hereof.

A plurality of pipeline supporting carriages, generally indicated at 66, are preferrably mounted along the longitudinal centerline of stinger segment 12 on support members 68 which preferrably extend transversely between corresponding stabilizing columns 60 upstanding from the tube-like members 32. At best illustrated in FIGS. 6–8, each pipeline support carriage 66 includes a base 70 secured to its associated support member 68. Base 70 mounts a pair of laterally upwardly inclined supports 72, which, in turn, mount laterally inclined rollers 74. By inclining rollers 74 as illustrated in FIGS. 6–8, there is formed a trough for receiving the pipeline whereby the latter is maintained against lateral movement relative to stinger segment 12 on pipeline support carriages 66. Pipeline support rollers 74, of course, permit translational movement of the pipeline relative to the stinger transition segment onto stinger 14 for disposition on the seabottom.

As illustrated in FIG. 3, the pipeline support carriages 66 are carried by the stabilizing columns 60 in a progressively decreasing height above the base structure 30 from the end of the stinger segment nearest the pipelaying vessel toward the opposite end of the segment such that a curved line extending along carriages 60 has a radius of curvature at least equal to and preferrably greater than the minimum allowable radius of curvature for the particular pipeline portion carried by the stinger segment. That is to say, the pipeline supporting carriages 66 support the pipeline in a manner such that the radius of curvature of the pipeline portion is always greater than that radius of curvature which would permit bending stresses on the pipeline in excess of the maximum allowable bending stress. The carriage support members 68 are preferably adjustable in height along the columns relative to base structure 30, by means not shown, whereby the radius of curvature of the portion of the pipeline extending over the carriages 66 can be preselected, if desired, in accordance with the characteristics of the pipeline being laid to avoid pipeline rupture. A plurality of longitudinally extending supports 78 interconnect the upper ends of the adjacent columns 60 on each tubular member 32 and a pair of diagonal tubular supports 80 connect between members 32 and the central longitudinally support member 78 to reinforce the pipeline support structure.

Figure 2:
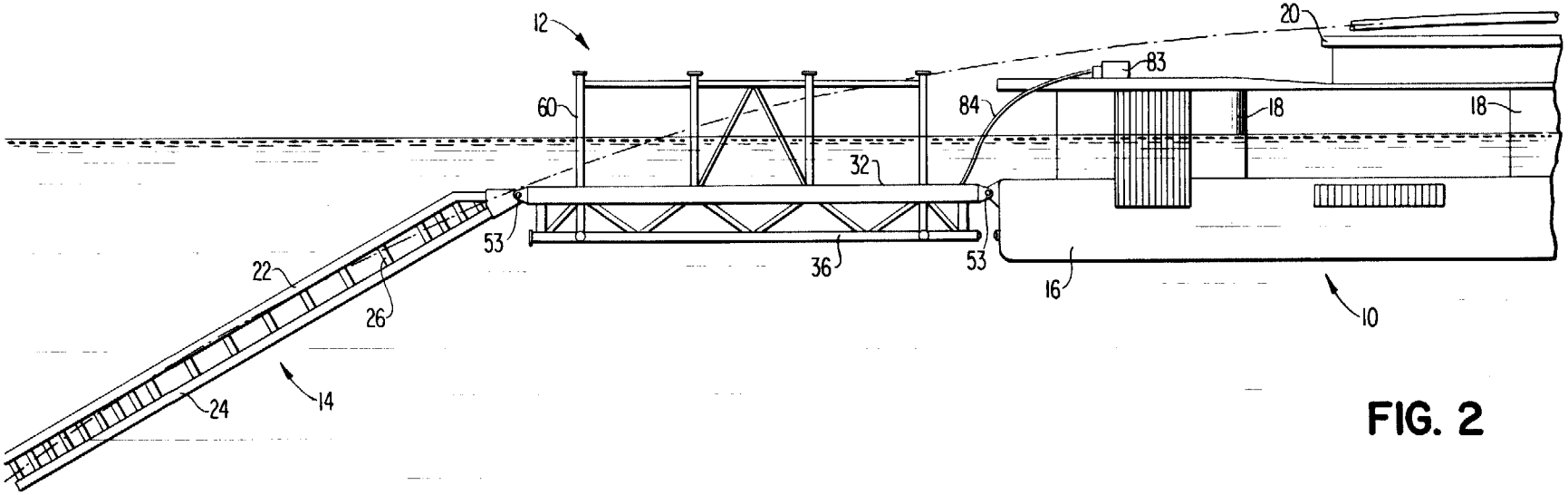
FIG. 2 is a fragmentary side elevational view of the pipelaying apparatus hereof.

Referring now to FIG. 4, it will be seen that each of the pontoon-like members 32 is compartmented to form a plurality of ballast chambers 81 for varying the draft of the stinger segment. Any number of chambers 81 can be provided as desired to perform the intended ballasting and deballasting function and each chamber is provided with a remotely controlled valve 82 for selectively opening and closing the associated chamber to the surrounding sea. The ballasting and deballasting of the stinger segment is preferrably controlled from the pipelaying barge. To this end, and in addition to suitable conventional controls, not shown, for operating valves 82 remotely, there is provided a suitable air pump, schematically illustrated at 83 in FIG. 2 in communication with each chamber 81 by a conduit 84 which, through a tee connection 85, lies in communication with a pair of conduits 86, each serving the compartments 81 in the respective tubular members 32. Conduits 84 and 86 serve as both exhaust lines for permitting air to vent from compartments 81 when ballasting the segment 12 and supply lines for introducing air into compartments 81 when deballasting segment 12 in a manner and for reasons to be described. Suitable remotely controlled valves 87 are provided in air lines 85 to selectively vent compartments 81 and to provide communication between pump 83 and compartments 81.

In use, the stinger transition segment 12 is coupled to the pipelaying barge 10 by hinge connections 46 and stinger 14 is coupled to the aft end of the stinger transition segment 12 by similar hinged connections. In the normal in transit condition to a work site, for example, in transit to an area where pipeline is to be laid, the barge 10 is maintained in an unballasted low draft condition whereby the hulls 16 support the barge in the water and float with freeboard. Similarly, the stinger transition segment 12 is also maintained in an unballasted condition whereby the base or hull structure 30 supports segment 12 in the water in a low draft condition with the tubular hull members 32 floating with freeboard. At the work site, both the ballast compartments in the barge 10 and in the transition segment 12 are ballasted to submerge the respective hulls 16 and hull structure 30 such that the columns 18 on barge 10 and columns 60 on transition segment 12 are submerged for approximately one-half their effective height h, thereby locating the mean waterline above the upper surface of the hulls 16 and base structure 30. The ballasting of stinger segment 12 is accomplished by remote actuation of valves 82 to permit ingress of sea water into compartments 81 while the air valves 87 are also remotely actuated to vent air from ballast compartments 81 through lines 84 and 86 to atmosphere at pump 83 (a suitable valve, not shown, being provided at pump 83) and thereby permit the ingress of ballast water.

When the barge and transition segment are ballasted to their working draft conditions, the pipeline carried by the barge can then be assembled on the work deck 20 and payed out onto the carriage supports 66 and through the slot S in stinger 14 for disposition on the seabottom. As the pipeline is initially payed out from barge 10 onto carriage supports 66, the remotely actuated valves 82 are opened to provide free communication between the surrounding seawater and compartments 81 and valves 87 are actuated to connect the air pump to air lines 84 and 86. The compartments 81 are progressively deballasted as additional pipeline is payed out from the barge onto transition segment 12. By progressively deballasting compartments 81 as additional pipeline is disposed onto segment 12, the latter is maintained in a predetermined column stabilized high draft position relative to the pipelaying barge 10 and the draft of segment 12 is not substantially altered as the weight of the additional pipeline is added to segment 12.

It will be appreciated that the displacement of the submerged portions of columns 60 and the residual displacement of the base structure 30 are adequate to maintain stinger segment 12 in a floating semisubmerged or high draft condition supporting the pipeline on carriages 66. In this manner, the maximum anticipated wave is prevented from acting against base structure 30 and acts only on columns 60 and the pipeline support structure in open frame area between columns 60 and above base structure 30. This reduces the adverse effect of wave action on the stinger segment 12 which, by proper configuration on the columns 60, and the weight and displacement of segment 12, has excellent motion minimizing characteristics in the floating high draft condition.

It will be appreciated that the primary purpose of utilizing both a column stabilized stinger transition segment and a column stabilized pipelaying barge is to minimize the vertical heave motions of these floating structures due to wave action. Ideally, this is accomplished by submerging segment 12 and barge 10 to approximately one half the effective height of the respective columns to preclude wave action against their respective base structures. The present pipelaying apparatus can accordingly operate efficiently in high sea conditions, for example, sea conditions having waves 11 to 12 feet in height or higher with minimum motion response to wave action. However, even when operating in the high draft condition with the motion minimizing characteristics afforded by the particular configuration of the pipelaying barge and transition segment, there is some response to wave action, i.e., the wave action against columns 18 and 60. Because of this, when the natural period of the combined pipelaying barge and stinger segment is the same as or close to the period of the waves according to existent sea conditions, there is amplification of the motion of the entire pipelaying apparatus which may become so excessive as to interfere with pipelaying operations even though both the barge and stinger segment are semisubmerged to the usual operating condition with the mean waterline located at approximately one half the effective height h of stabilizing columns 18 and 60. It is therefore desirous to alter the motion of the apparatus when such motion amplification occurs and this can be accomplished by either ballasting or deballasting concurrently both the barge and stinger segment within certain predetermined limits to submerge or emerge the barge and segment to a greater or lesser extent from the ideal submergence which locates the mean water surface at one half the effective height h. The maximum variation of submergence of the segment from the ideal submergence by ballasting or deballasting the segment is, however, limited to distances within a range which do not reorient the barge and segment to positions wherein wave action there against causes excessive impact. Thus, to preclude excessive barge and segment heave motion and impact caused by interaction of the barge and stinger segment with wave motion, a maximum variation, i.e., submergence or emergence, of barge 10 and segment 12 as by ballsting or deballasting, respectively from the ideal submergence of one half h, is such that the distance between the mean water surface and either the upper end of the columns 18 and 60 or the topside of the hulls 16 and base structure 30 is not less than 0.75 of the mean wave height. It is thus significant that the foregoing barge and stinger segment have optimum stability characteristics in the floating semisubmerged or high draft condition.

It will thus be appreciated that stinger transition segment 12 provides adequate support for the pipeline as the latter is paid out from the pipelaying barge 10. Particularly, transition segment 12 supports that length of pipeline which desirably and necessarily extends through the air from the elevated work deck 20 adjacent the aft end of the pipelaying barge to the point of entry of the pipeline into the water in a manner which substantially precludes relative heave motion of the transition segment 12 and pipelayig barge. These features permit the work area or platform 20 on which the pipe sections are connected one to the other and payed out from the barge to lie at an elevated position above the mean waterline fór example, on the order of 15 to 20 feet. Note that the air length of the pipeline between the work deck and its point of entry into the water is fully supported and obtains a radius of curvature in its transition from the work deck to the water well within the allowable radius of curvature whereby rupture of the pipeline is avoided.

It is a further particular feature hereof that the column stabilized stinger segment can be employed with barges of conventional construction and having elevated work areas or column stabilized barges of the type herein illustrated, that is, a column stabilized type barge as disclosed in application Ser. No. 705,175 of common assignee herewith. To this end, transition segment 12 is constructed to obtain specified natural periods. When the pipeline portion is laid over the stinger segment and the stinger attached, this combination provides known predetermined natural periods. Note that this natural period can be altered by changing the submergence level to vary the draft and displacement of the stinger segment thereby obtaining a natural period of the stinger segment, and pipeline combination which is adjustable to a limited extent within a predetermined range. The natural period of a pipelaying barge is known from its physical characteristics. By matching the natural period of the stinger combination including the pipeline carried thereby, with the pipelaying barge, that is, by particularly configuring the stinger combination, considering the weight of the pipeline, to provide a natural period approximating the natural period of the barge with which the stinger segment will be utilized, it is possible to match their natural periods whereby substantially identical stinger combination and pipelaying barge response to wave action can be achieved. Where the combination stinger and pipeline portion has a natural period which cannot be altered by variation in the submergence level by ballasting or deballasting to approximate the natural period of the pipelaying barge with which the vessel will be utilized, the stinger segment 12 can be constructed to obtain a natural period more nearly approximate to the natural period of the pipelaying barge by proper design of the cross section area of the columns, by altering its weight and displacement, its length and width configuration and other factors.

In a preferred embodiment hereof, particularly configured for employment with the column stabilized barge described and illustrated in my copending application Ser. No. 705,175 filed Feb. 13, 1968, the column stabilized stinger attachment hereof has an overall length of 115 feet and a width of 24.5 feet. Tubular members 32 have an outside diameter of 4.5 feet and are spaced one from the other on axes 20 feet apart. Keel members 36 has an outside diameter of 2.5 feet and its axis is located 10 feet vertically below a plane containing the centerlines or axes of members 32. Diagonal bracing 34 preferrably has outside diameters of 3 feet while brace members 38 have outside diameters of 2 feet. The columns 60 are preferrably 29 feet in height from the centerline of members 32 and are 2 feet in diameter. The centerlines of columns 60 are longitudinally spaced 28 feet one from the other and are disposed symmetrically about the pitch axis. Anodes, not shown, are preferrably disposed on the stinger attachment to preclude corrosion.

In laying, for example, a 24 inch O.D. 0.625 inch pipe having a 1.8 inch concrete coating, the maintenance of a radius of 800 feet is required to preclude obtaining bending stresses exceeding the maximum allowable bending stresses. To obtain this, the carriage support members 68 nearest the barge is located 26 feet 3¾ inches above the plane containing the centerline of the members 32 while the three remaining columns have their associated carriage support members located, in descending height, 20 feet 6¼ inches; 13 feet 8½ inches; and 5 feet 8¾ inches above such plane. The foregoing specific heights of the carriage support members are provided in connection with the laying of pipe from the column stabilized barge previously referenced with the deck 20 elevated 23 feet above the mean waterline (assuming the barge lies in a high draft column stabilized position with the mean waterline located at one half the effective height of columns 18) and with the pipeline support on the barge disposed 4 feet 3 inches above deck 20 and 128 feet 8½ inches forward of the stern of the barge whereby the stinger attachment provides for an overall transition through the air of the pipeline from a position 128 feet 8½ inches forward of the barges stern and 27 feet 3 inches above the mean waterline to a point intersecting the mean waterline at about 228 feet aft of the barge support.

Referring now to the form of the invention disclosed in FIG. 9, there is disclosed a plurality of stinger segments 12 connected one to the other by their hinge connections in end to end relation. Instead of mounting pipeline support carriages 66 such that a predetermined radius of curvature is obtained, the mounting carriages 66, in this form, are secured to lie in the same horizontal plane adjacent the upper ends of the columns 60. Segments 12 are in all other respects identical to the transition segments heretofore described and illustrated. By forming a string of connecting segments 12, it will be appreciated that the pipeline P can be supported in spaced relation above the mean waterline by the carriage supports to extend for example, between a pair of fixed terminals not shown, on opposite shores of a lake or river, or the like. By ballasting each of the segments 12 as previously described, the base structures 30 can be submerged such that segments 12 obtain a high draft column stabilized condition substantially impervious to wave action. Thus, heave motions of the string of segments are substantially eliminated between the terminals whereby the pipeline P is supported in a substantially fixed vertical position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A transition segment for laying pipeline on an underwater surface from a floating vessel having a pipeline work deck elevated above the mean waterline comprising:

an elongated base structure;

a plurality of elements upstanding from said base structure with at least a number of said elements comprised of buoyant stabilizing columns located on opposite sides of the pitch and roll axes of the segment;

buoyancy control means for submerging said base structure and portions of said upstanding elements below the waterline to obtain a high draft floating condition, the displacement of the submerged base structure and portions of said upstanding elements being sufficient to maintain the segment buoyant in a pipeline portion supporting condition with the mean waterline located intermediate the height of said columns;

means carried by said segment adjacent its forward end for pivotally coupling the latter to the pipelaying vessel;

and means carried by said segment for supporting a portion of a pipeline for translational movement therealong, said pipeline support means being located above said base structure at elevations of decreasing height relative to said base structure in a forward to aft direction along said segment, the pipeline support means being adapted to receive pipeline payed out from the elevated work deck of the pipelaying vessel.

2. Apparatus according to claim 1 together with a stinger, means carried by said stinger adjacent its forward end for pivotally coupling said stinger to said segment, and means carried by said stinger for receiving the pipeline payed out from the vessel and said segment.

3. Apparatus according to claim 1 including said vessel, said coupling means pivotally coupling the forward end of said segment to the aft end of said vessel.

4. Apparatus according to claim 2 wherein said submerging means includes means for ballasting and deballasting said segment, and control means carried by said vessel for selectively ballasting and deballasting said segment.

5. Apparatus according to claim 3 including a stinger, means for coupling said stinger to the opposite end of said segment, and means carried by said stinger for receiving the pipeline payed out from said vessel and said segment.

6. Apparatus according to claim 1 including means for varying the submergence of the segment in the high draft condition.

7. Apparatus according to claim 1 wherein said stabilizing columns have a substantially uniform cross sectional area throughout their effective height, the cross sectional area and configuration of the columns, the weight distribution of the segment and the geometry of the submerged base structure being such as to provide segment motion minimizing characteristics in the pipeline portion supporting high draft condition.

8. Apparatus according to claim 1 wherein said base structure includes a pair of elongated transversely spaced hull members, at least a pair of said columns being carried by each of said members, and means connecting said members one to the other.

9. Apparatus according to claim 8 wherein said submerging means includes means for selectively ballasting and deballasting said base structure.

10. Apparatus according to claim 8 wherein said hull members include a plurality of compartments, valve means associated with said compartments for introducing water ballast into and expelling water ballast from said compartments.

11. Apparatus according to claim 1 wherein said support means progressively decreases in height above the base structure from the end of the segment nearest the vessel toward the opposite end of the segment such that a line extending along said support means has a radius of curvature at least equal to the minimum allowable radius of curvature of the pipeline portion.

12. Apparatus according to claim 11 wherein said support means comprises a plurality of rollers disposed at longitudinally spaced positions along said segment and lying substantially coincident with the longitudinal centerline of the segment.

13. Apparatus according to claim 12 wherein said base structure includes a pair of elongated transversely spaced hull members, at least a pair of said columns being carried by each of said members, a plurality of support struts extending between laterally adjacent columns, said rollers being disposed on said support struts.

14. Apparatus according to claim 3 wherein said vessel includes a plurality of columns upstanding from a hull structure whereby said vessel is column stabilized in a high draft condition.

15. Apparatus according to claim 1 wherein said base structure includes a pair of elongated transversely spaced hull members, at least a pair of said columns being carried by each of said members, said base structure having sufficient displacement to float the segment in a low draft condition with the base structure having freeboard, said submerging means including means for ballasting said hull members to change the draft of the segment from said low draft condition to said high draft condition.

16. Apparatus for laying pipelines on an underwater surface comprising:

a floating vessel having a pipeline work deck elevated above the mean waterline;

a transition segment having an elongated base structure;

a plurality of elements upstanding from said base structure with at least a number of said elements comprised of buoyant stabilizing columns located on opposite sides of the pitch and roll axes of said segment;

means carried by said segment for supporting a portion of a pipeline for translational movement therealong and adapted to receive pipeline payed out from the elevated work deck of the pipelaying vessel;

means for ballasting and deballasting said segment to selectively obtain high and low draft floating conditions with said base structure and portions of said upstanding elements located below the waterline in the high draft condition, the displacement of the submerged base structure and portions of said upstanding elements being sufficient to maintain the segment buoyant in the high draft pipeline portion supporting condition with the mean waterline located intermediate the height of said columns;

means for pivotally coupling the forward end of said segment to the aft end of said vessel;

and buoyancy control means carried by said vessel for selectivey ballasting and deballasting said segment.

17. Apparatus according to claim 16 together with a stinger, means carried by said stinger adjacent its forward end for pivotally coupling said stinger to said segment, and means carried by said stinger for receiving the pipeline payed out from the vessel and said segment.

18. A transition segment for laying pipelines on an underwater surface from a floating vessel having a pipeline work deck elevated above the mean waterline comprising:

an elongated base structure;

a plurality of elements upstanding from said base structure with at least a number of said elements including buoyant stabilizing columns located on opposite sides of the pitch and roll axes of the segment;

said stabilizing columns extending above said base structure a predetermined height;

said segment having a displacement sufficient to locate said base structure and portions of said upstanding elements below the waterline with the mean waterline located above the base structure intermediate the height of said stabilizing columns;

the cross sectional area and configuration of the columns, the weight distribution of the segment and the geometry of the submerged base structure being such as to provide segment motion minimizing characteristics in the pipeline portion supporting condition;

means carried by the base structure for pivotally coupling the segment to the pipelaying vessel;

and means carried by said segment for supporting a portion of a pipeline for translational movement therealong, said pipeline support means being located above said base structure at elevations of decreasing height relative to said base structure in a forward to aft direction along said segment, the pipeline support means being adapted to receive pipeline payed out from the elevated work deck of the pipelaying vessel.

19. Apparatus according to claim 18 including means for varying the draft of the segment in the pipeline supporting condition.

20. Apparatus according to claim 18 wherein said stabilizing columns have a substantially uniform cross sectional area throughout their height.

21. Apparatus according to claim 18 wherein said base structure includes a pair of elongated transversely spaced hull members, at least a pair of said columns being carried by each of said members, and means connecting said members one to the other.

22. Apparatus according to claim 18 together with a stinger, means carried by said stinger adjacent its forward end for pivotally coupling said stinger to said segment, and means carried by said stinger for receiving the pipeline payed out from the vessel and said segment.

23. Apparatus according to claim 18 including said vessel, said coupling means pivotally coupling the forward end of said segment to the aft end of said vessel.

24. Apparatus according to claim 23 including a stinger, means for coupling said stinger to the opposite end of said segment, and means carried by said stinger for receiving the pipeline payed out from said vessel and said segment.

25. A transition segment for laying pipelines on an underwater surface from a floating vessel having a pipeline work deck elevated above the mean waterline comprising:

an elongated base structure comprised of a pair of transversely spaced hull members and an elongated keel spaced below said hull members, means connecting said hull members and said keel each to the other;

a plurality of elements upstanding from said base structure with at least a number of said elements including buoyant stabilizing columns located on opposite sides of the pitch and roll axes of the segment, at least a pair of said columns being carried by each of said hull members;

said stabilizing columns extending above said base structure a predetermined height;

said segment having a displacement sufficient to locate said base structure and portions of said upstanding elements below the waterline with the mean waterline located above the base structure intermediate the height of said stabilizing columns;

means carried by the base structure for pivotally coupling the segment to the pipelaying vessel;

and means carried by said segment for supporting a potion of a pipeline for translational movement therealong, said pipeline support means being located above said base structure at elevations of decreasing height relative to said base structure in a forward to aft direction along said segment, the pipeline support means being adapted to receive pipeline payed out from the elevated work deck of the pipelaying vessel.

26. Apparatus according to claim 25 wherein said hull members, keel and connecting means define a generally open framework, said hull members and said keel being arranged in a generally triangular configuration in a plane generally normal to the longitudinal centerline of the segment.

27. Apparatus according to claim 1 wherein said base structure includes a pair of elongated transversely spaced hull members and a keel, at least a pair of said columns being carried by each of said members, means connecting said hull members and said keel each to the other and defining a generally open framework, said hull members and said keel being arranged in a generally triangular configuration in a plane generally normal to the longitudinal centerline of the segment.

28. Apparatus according to claim 2 wherein said stinger comprises a plurality of articulated stinger segments.

29. Apparatus according to claim 17 wherein said stinger comprises a plurality of articulated stinger segments.

30. Apparatus according to claim 23 wherein said vessel has a longitudinal centerline, said segment having a longitudinal centerline laterally offset from the vessel centerline when said vessel and segment are coupled one to the other.

31. Apparatus according to claim 3 wherein said vessel includes a base structure;

a working platform;

a plurality of elements upstanding from the base structure of said vessel with at least one portion of said elements being connected to said platform to support the platform in spaced relation above said base structure;

at least a portion of the upstanding elements of said vessel including at least six stabilizing columns disposed on the base structure of said vessel and upstanding therefrom a predetermined height, a pair of the columns of said vessel being located adjacent opposite ends of said base structure on opposite sides of the pitch axis of said vessel, at least three columns of the vessel being located on opposite sides of the roll axis of the vessel;

the base structure of said vessel having a displacement sufficient to float the vessel in a low draft condition;

means for ballasting and deballasting the vessel to respectively submerge its base structure and portions of its elements below said platform below the waterline thereby to provide a high draft, otherwise unsupported, floating condition and return the vessel to the low draft condition;

the displacement of the submerged base structure and portions of said elements of said vessel being sufficient to maintain the vessel buoyant in the high draft floating condition; the combined water plane areas of the columns of said vessel forming at least the major portion of the total water plane area of said vessel in the high draft condition; the cross-sectional area and configuration of the columns of said vessel, the weight distribution of the vessel, and the geometry of the submerged base structure and portions of said elements of said vessel being such that the vessel obtains motion minimizing characteristics in the high draft condition;

and means carried by the vessel for conducting pipelaying operations while the vessel is maintained in the high draft floating condition.

*32. Apparatus for laying pipe on an underwater surface comprising:*

*a floating vessel including a pair of elongated hulls disposed in spaced side-by-side relation;*

*a working platform including a pipeline workdeck spaced above said hulls a predetermined height;*

*means for supporting said platform in fixed spaced relation above said hulls including columns connected to said hulls and said platform, at least three of such columns being connected with each of the hulls on opposite sides of the roll axis of the vessel with pairs of such columns being located near opposite ends of each of said hulls on opposite sides of the pitch axis of the vessel and another of said columns being located at an intermediate position on each hull;*

*the distance between the extremities of said vessel along its longitudinal centerline being substantially greater than the distance between the extremities of said vessel along its transverse centerline;*

*said hulls having ballast compartments for ballasting said vessel to alter its draft between a low draft hull supported floating condition and a high draft semi-submerged column stabilized floating condition with said pipeline workdeck elevated above the mean waterline a distance at least about fifteen feet;*

*said columns having predetermined cross-sectional areas and being located on the hulls to provide righting moments about the pitch and roll axes of said vessel when in high draft condition; the centroid of the cross-sectional area of each of said columns lying transversely outboard the centerline of the hull to which said column is connected;*

*means including an elongated segment adjacent one end of said vessel and extending generally longitudinally therefrom for supporting at least the portion of the pipeline payed out from said elevated pipeline workdeck which extends through the air between said one vessel end and a location spaced from said vessel at which the pipeline enters the water;*

*means carried by said segment and said vessel for pivotally connecting said support segment to said vessel, said support segment including means for maintaining the radius of curvature of the pipeline greater than the radius of curvature which would permit bending stresses on the pipeline in excess of its allowable bending stress.*

*33. Apparatus according to claim 32 wherein said elevated pipeline workdeck extends longitudinally substantially along one side of the centerline of said vessel, said pipeline support means extending longitudinally from said one end of the vessel and from said one side of the vessel.*

*34. Apparatus according to claim 32 wherein said pivotal connecting means includes a pivotal connection between said vessel and said support segment carried by at least one of said hulls.*

*35. Apparatus according to claim 32 wherein at least one of said columns on each said hull has a longitudinal dimension in the direction of the longitudinal centerline of said vessel greater than its transverse dimension.*

*36. A column stabilized semisubmersible pipelaying barge and pipeline support apparatus comprising:*

*a pair of elongated hulls disposed in spaced side-by-side relation;*

*a working platform spaced above said hulls a predetermined height including a pipeline work deck on which pipe sections can be secured in end-to-end relation one to the other to form a pipeline longitudinally extending generally in the direction of the longitudinal centerline of said barge;*

*means for supporting said platform in spaced relation above said hulls including at least three columns connected to each of said hulls and said platform on opposite sides of the barge roll axis, with pairs of columns disposed on opposite sides of the barge pitch axis and located near opposite ends of the barge;*

*the distance between the extremities of said barge along the longitudinal centerline thereof being substantially greater than the distance between the extremities of said barge along its transverse centerline;*

*said hulls having ballast compartments for ballasting said barge to alter its draft between a low draft hull supported floating condition with the hulls having freeboard and a high draft semisubmerged column stabilized floating and pipelaying condition with the pipeline work deck elevated a substantial distance above the mean waterline, so that pipeline payed out from said elevated pipeline work deck when said barge lies in said high draft condition curves downwardly toward the water as it extends through the air between said elevated pipeline work deck and a location at which the pipeline enters the water,*

*said columns having predetermined cross-sectional areas and being located on the hulls to provide righting moments about the pitch and roll axes of said barge when in said high draft condition;*

*pipeline support means connected to said barge and extending generally longitudinally of the barge and in a predetermined attitude relative to said barge work deck for supporting at least the downwardly curved portion of the pipeline payed out from said elevated work deck which extends through the air between said barge and the location at which the pipeline enters the water, and*

*means for maintaining said pipeline support in said predetermined attitude relative to said barge thereby to maintain the radius of curvature of the downwardly curved pipeline portion greater than the radius of curvature which would permit bending stresses on the pipeline in excess of its allowable bending stress.*

*37. Apparatus according to claim 36 wherein: each of said hulls has top and bottom substantially planar horizontally disposed surfaces extending substantially perpendicular to a vertical plane through the longitudinal centerline of said vessel with the transverse horizontal dimension of each hull being greater than its vertical dimension for a major portion of the length of said hulls; said columns are substantially constant in cross section for substantially their entire effective height between said platform and said hulls; and said work deck is located at an elevation at least 15 feet above the mean waterline when said barge lies in said high draft column stabilized pipelaying condition.*

*38. Apparatus according to claim 37, wherein said columns have their centroids located transversely outboard of*

*the centerline of the hull to which said column is connected.*

*39. Apparatus according to claim 38, wherein each of said columns on each said hull has a dimension in the longitudinal direction greater than its dimension in the transverse direction.*

*40. Apparatus according to claim 37, wherein said means for maintaining said pipeline support include a plurality of discrete supports longitudinally spaced one from the other along said pipeline support and arranged such that a curved line through successive ones of said supports has a radius of curvature greater than the radius of curvature which would permit bending stresses on the pipeline in excess of its allowable bending stress.*

*41. Apparatus according to claim 37 wherein said pipeline support is pivotally connected to the stern of said barge at an elevation below said work deck.*

*42. Apparatus according to claim 37 wherein said pivotal connection lies at an elevation below the elevation of said top hull surfaces.*

*43. Apparatus according to claim 36 wherein said pipeline work deck is generally horizontally disposed; and said work deck and said columns are relatively disposed such that pipeline is payed out from said pipeline work deck at an elevation no lower than the juncture of the upper ends of the columns and the underside of said platform.*

*44. Apparatus according to claim 36 wherein: one pair of said columns is disposed near the aft end of said vessel; said work deck and said columns are relatively disposed such that pipeline is payed out from said pipeline work deck and from the aft end of said vessel at an elevation no lower than the juncture of the upper ends of the aftmost columns on said hulls and the underside of said platform; said pipeline support being pivotally connected to said barge adjacent its aft end and extending generally longitudinally therefrom for supporting at least the downwardly curved portion of the pipeline payed out from said elevated pipeline work deck and the aft end of said vessel which extends through the air between said barge and the location at which the pipeline enters the water.*

*45. Apparatus according to claim 36 including means for adjusting the elevation of said pipeline support means relative to said work deck.*

*46. Apparatus according to claim 36 including means for adjusting the elevation of said pipeline support means relative to the mean waterline.*

* * * * *

UNITED STATES PATENT OFFICE

CERTIFICATE OF CORRECTION

Patent No. Re. 29,591 Dated March 28, 1978

Inventor(s) Samuel H. Lloyd

It is certified that error appears in the above-identified patent and that said Letters Patent are hereby corrected as shown below:

The term of this patent subsequent to August 22, 1989 has been disclaimed.

Signed and Sealed this

*Twelfth* Day of *September 1978*

[SEAL]

*Attest:*

RUTH C. MASON
*Attesting Officer*

DONALD W. BANNER
*Commissioner of Patents and Trademarks*